3,235,387
METHOD FOR PRODUCING SOUR CREAM DRESSING

Charles R. Stumbo, Rogersville, and Burdet Heinemann, Springfield, Mo., assignors to Producers Creamery Company, Springfield, Mo., a corporation of Missouri
No Drawing. Filed Apr. 9, 1963, Ser. No. 271,610
7 Claims. (Cl. 99—59)

This invention relates to dairy products. More particularly, this invention relates to a sour cream dressing and a method of producing the same. The product has substantially the same characteristics, e.g., body, taste and color, as sour cream and retains these characteristics over a prolonged period of time.

Sour cream is a smooth, heavy-bodied dairy product which is made by pasteurizing, homogenizing and ripening a light cream. The ripening is accomplished by means of a commercial starter containing *Streptococcus lactis*, together with other flavor-producing bacteria. The pleasant, mild-acid flavor and the smooth, firm body are mainly due to these microorganisms. This product is known on the market as cultured cream, cultured market cream, cultured sour cream and salad cream.

Sour cream provides a flavorful base for various dressings, sauces, and spreads for salads, meats, pastries, and the like, and has long been used in the culinary art in the preparation of many dishes and traditional foods. However, it is difficult to produce sour cream having uniform taste characteristics and satisfactory keeping qualities.

One way of preparing sour cream is to merely allow cream to stand at the proper temperature whereby the naturally occurring bacteria sour the cream. This method of preparation produces a sour cream which is satisfactory for many cooking purposes. However, there is a tendency for the whey to separate from the curd and it is difficult, if not impossible, to consistently prepare a product of uniform flavor since the growth of unwanted bacteria, yeasts and mold results in undesirable flavor variations. Therefore, sour cream produced by this method is not generally suited for most uses where good flavor, body and texture is desired and a demand has arisen for a sour cream product of uniform quality.

Commercially, sour cream is usually prepared by pasteurizing and homogenizing cream and then adding a culture to the cream. Generally, the cream is standardized to have a fat content of 18% and above and pasteurized by heating to a temperature, for example, of 170° F. for about 5 minutes. The cream is then homogenized and cooled to the ripening temperature of about 70° F. and the cream is inoculated with a lactic acid producing culture. Oftentimes a coagulator such as rennet is added at the same time. After the ripening period of about 14 hours at 70° F., the resulting sour cream is chilled and packaged for distribution.

A sour cream product prepared by the foregoing method will vary in characteristics such as body or viscosity but is satisfactory for all food purposes. However, even when refrigerated, sour cream has shelf life of only from 6 to 9 days after which the product rapidly deteriorates. The whey will separate from the curd and the delicate flavor is adversely affected. Consequently, the distribution of conventional sour cream must be immediate and thus the costs of merchandising are high.

It is therefore an object of this invention to provide a sour cream dressing which has the desirable characteristics of sour cream.

It is another object of this invention to provide a sour cream dressing which has a greatly increased shelf life over that of a conventional sour cream product.

It is still another object of this invention to provide a sour cream dressing wherein the tendency of the curd to separate from the whey is substantially eliminated.

It is a further object of this invention to provide a sour cream dressing of good body and flavor.

It is a still further object of the present invention to provide a method for the production of an improved sour cream dressing.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that the above objects may be attained by adding stabilizers to commercially prepared sour cream during the production thereof. The stabilizers comprise a gum or mixture of gums together with starch. The resultant sour cream dressing has a smooth, firm body and a delicate flavor and the product will retain these characteristics without wheying off for a period of time of from 6 weeks to 3 months.

The gums which have been found especially effective are locust bean gum and guar gum and the same are preferably added in combination in amounts between about 0.05% and about 0.5% by weight of the sour cream. Below 0.05%, the tendency toward synersis or wheying off is increased to an unsatisfactory level. While it is preferred to include both of the above-mentioned gums, a satisfactory product is obtained when larger amounts of locust bean bum alone are utilized. Preferably, between 0.1% and 0.25% by weight of the gums are used. Above 0.25%, a slight gum flavor is imparted to the product, although this is not considered objectionable until about 0.5% is incorporated.

Together with the gums, a starch is incorporated in an amount between about 1% and about 5% by weight and preferably from about 1.5% to about 2.5% by weight of the sour cream. Tapioca starch and potato starch have been found to be particularly suitable. When used in amounts below about 1%, body of the dressing is not satisfactory and whey may separate. Amounts above about 5% cause undesirable stiffness. It has been found that incorporation of the gums and starch reduces or eliminates the wheying off characteristics of conventional sour cream and retains the delicate body, i.e., texture and viscosity of a sour cream product for long periods of time.

In a preferred method of preparing sour cream dressing according to the present invention, cream is standardized to a butter fat of between about 18% and 25%, preferably from 19% to 21%. The total solids content will vary with the butter fat content and will range from 28% to 35%, preferably from 29% to 31%. The cream is pasteurized, for example, at 170° F. for about 5 minutes, and then homogenized to disperse the butter fat throughout the liquid at a pressure of about 2500 p.s.i. and the homogenized cream is cooled to a temperature of about 70° F. A suitable culture is added to the pasteurized and homogenized cream, preferably together with a coagulator such as rennet, and the cream is allowed to ripen. This is accomplished by letting the cream stand at a temperature of about 70° F. for about 14 hours. The cream is then again heated to a temperature of about 100° F. and the stabilizers are added. Preferably, citric acid in an amount from about 0.05% to about 0.4% by weight, preferably from 0.1% to 0.2% by weight, is added after the stabilizers and the cream is heated to about 170° F. Preferably, a culture aroma is added and the cream is again homogenized, for example at a pressure of about 3000 p.s.i. The dressing is now ready to be filled into containers and chilled for distribution.

In the following examples and throughout the specification and claims, all parts are parts by weight unless otherwise specified.

*Example 1*

100 parts of cream containing 22% butter fat was pasteurized at a temperature of 170° F. for 5 minutes and homogenized at a pressure of 2500 p.s.i. The cream was cooled to 70° F. and lactic acid starter together with .04 part of rennet were added. The cream was allowed to stand at a temperature of 70° F. for 14 hours to ripen and then heated to a temperature of 100° F. At this point, 0.1 part guar gum, 0.15 part locust bean gum and 2 parts of tapioca starch were added with constant mechanical agitation and the mixture was heated to 170° F. Culture aroma was added in an amount of 0.0088 part. The mixture was again homogenized at a pressure of 3000 p.s.i. and filled hot into containers which were then chilled. The resulting sour cream dressing had excellent body and flavor which were retained for well over 6 weeks.

*Example 2*

The procedure of Example 1 was repeated with the exception that 1 part of tapioca starch was used. The resulting sour cream dressing had excellent body but there was a slight wheying off after storage for about 1 week.

*Example 3*

The procedure of Example 1 was repeated using 1.5 parts of tapioca starch. The product was satisfactory in all respects.

*Example 4*

The procedure of Example 3 was repeated using cream of 19 percent butter fat and the locust bean gum was omitted. The sour cream dressing had excellent body and flavor but was not resistant to wheying off.

*Example 5*

Example 3 was repeated using cream of 19 percent butter fat and the guar gum was omitted. The results were similar to those of Example 4.

*Example 6*

Example 5 was repeated with an increase of locust bean gum to 0.25 part. The resulting product had good body and did not whey off.

Examples 4–6 illustrate that preferably both locust bean gum and guar gum are included in the sour cream dressing. If locust bean gum alone is used, it must be used in a larger amount to prevent wheying off.

*Example 7*

The procedure of Example 1 was repeated with the exception that both gums were omitted and 5 parts of tapioca starch were utilized. While the resulting product did not whey off, the characteristic body of sour cream was not present. This example illustrates that a gum must be included to achieve the improved results of the present invention.

While specific operating conditions have been given with regard to the foregoing embodiments and specific examples, it is to be understood that variations are acceptable. For example, the cream may be pasteurized at temperatures between 143° and 180° F. for from about 30 minutes to about 0.10 minute, homogenized at pressures between 500 and 3500 p.s.i., cooled to a temperature between 55° and 75° F. and ripened for from 12 to 24 hours or until the desired acidity is reached. The cream may then be heated to a temperature between 75° and 170° F. for addition of the stabilizers and further heated to a temperature between 140° and 180° F. for addition of the culture aroma and final homogenization at a pressure between 500 and 3500 p.s.i.

Similarly, while in the preferred embodiment the starting material is sweet cream, the present invention may be applied to cultured sour cream prepared by prior art methods. In this process, the sour cream is heated to a temperature between 75° and 170° F. and the stabilizers are added. The sour cream is further heated to a temperature between 140° and 180° F., the culture aroma is added and the mixture homogenized at a pressure between 500 and 3500 p.s.i.

In the specific examples, tapioca starch has been used. Potato starch is equally suitable. The culture aroma may be added in amounts between 0.001 and 0.00001 percent by weight. By culture aroma is meant flavor and aroma components in the steam distilled fraction of butter cultures prepared by the lactic fermentation of milk. The citric acid is added to enhance flavor and increase acidity.

What is claimed is:

1. A method for producing sour cream dressing which comprises heating cultured sour cream to a temperature between 75° and 170° F., adding to said sour cream from about 0.05% to about 0.5% by weight of a gum selected from the group consisting of locust bean gum and mixtures thereof with guar gum from about 1% to about 5% by weight starch, heating the mixture to between about 140° and 180° F. and homogenizing said mixture.

2. A method for producing sour cream dressing which comprises standardizing cream to between about 18% and 25% butter fat content, pasteurizing and homogenizing said cream, adding a starter and coagulator thereto, curing the mixture to the desired acidity, heating to a temperature between about 75° and 170° F., adding from about 0.05% to 0.5% by weight of a gum selected from the group consisting of locust bean gum and mixtures thereof with guar gum, from about 1% to about 5% by weight starch and from about 0.05% to 0.4% by weight citric acid, heating the mixture to between about 140° and 180° F. and homogenizing said mixture.

3. The method according to claim 2 wherein there is added both locust bean gum and guar gum.

4. The method according to claim 2 wherein there is added from about 0.1% and 0.25% by weight of a gum selected from the group consisting of locust bean gum and mixtures thereof with guar gum and from about 1.5% to about 2.5% starch.

5. The method according to claim 2 wherein the starch is selected from the group consisting of tapioca starch and potato starch.

6. The method according to claim 2 wherein the cream is pasteurized at a temperature between about 143° and 180° F. for from about 30 minutes to 0.10 minute and homogenized at a pressure between about 500 and 3500 p.s.i., cooled to between about 55° and 75° F., ripened at a temperature between about 55° and 75° F. for from 12 to 24 hours and finally homogenized at a pressure between about 500 and 3500 p.s.i.

7. The method according to claim 2 wherein prior to homogenization there is added from 0.001 to 0.00001 percent by weight culture aroma.

References Cited by the Examiner

UNITED STATES PATENTS

| | | | |
|---|---|---|---|
| 1,815,727 | 7/1931 | Reynolds et al. | 99—59 |
| 2,217,699 | 10/1940 | Musher | 99—144 |
| 2,279,202 | 4/1942 | Musher | 99—117 |
| 2,338,083 | 1/1944 | Buchanan et al. | 99—144 |
| 2,719,793 | 10/1955 | Page et al. | 99—59 |

A. LOUIS MONACELL, *Primary Examiner.*